United States Patent

Everitt et al.

[11] Patent Number: 6,028,122
[45] Date of Patent: Feb. 22, 2000

[54] ENERGY ABSORBING, WATER BLOWN, RIGID POLYURETHANE FOAM

[75] Inventors: Lori R. Everitt, Trenton; Richard P. Harrison, Lincoln Park; Vechelle R. Onufrak, New Boston, all of Mich.

[73] Assignee: BASF Corporation, Mount Olive, N.J.

[21] Appl. No.: 08/955,146

[22] Filed: Oct. 21, 1997

[51] Int. Cl.$^7$ .................................................. C08G 18/48

[52] U.S. Cl. .......................... 521/137; 521/167; 521/174; 252/182.24

[58] Field of Search ..................... 521/167, 174, 521/137; 252/182.24

[56] References Cited

U.S. PATENT DOCUMENTS

| | | | |
|---|---|---|---|
| 4,866,102 | 9/1989 | Pray et al. | 521/137 |
| 5,039,712 | 8/1991 | Brock | 521/126 |
| 5,143,941 | 9/1992 | Rossio et al. | 521/51 |
| 5,167,884 | 12/1992 | Rossio | 264/45.5 |
| 5,187,204 | 2/1993 | Jackson et al. | 521/111 |
| 5,216,041 | 6/1993 | Rossio et al. | 521/137 |
| 5,248,703 | 9/1993 | Krueger et al. | 521/125 |
| 5,248,704 | 9/1993 | Rossio et al. | 521/137 |
| 5,258,416 | 11/1993 | Krueger et al. | 521/125 |
| 5,284,882 | 2/1994 | Rossio et al. | 521/137 |
| 5,453,455 | 9/1995 | Krueger et al. | 521/125 |
| 5,457,137 | 10/1995 | Milliren et al. | 521/115 |
| 5,607,982 | 3/1997 | Heyman et al. | 521/67 |
| 5,686,502 | 11/1997 | Murray et al. | 521/174 |

FOREIGN PATENT DOCUMENTS

078445-A1  5/1983  European Pat. Off. .

OTHER PUBLICATIONS

Great Britain Search Report Dated Mar. 4, 1999.
WPI 85–007379 [25]–DE 3323872 (Bayer) Abstract, Jan. 3, 198.
WPI 74–55735V [31]–JP 49008595 (Nippon) Abstract, Jan. 25, 197.

*Primary Examiner*—Rachel Gorr
*Attorney, Agent, or Firm*—Fernando A. Borrego

[57] ABSTRACT

The invention relates to compositions and method for producing energy absorbing, water blown, rigid polyurethane foams. The resulting polyurethane foams are low density, predominately open celled foams which exhibit a relatively constant consistency of compressive strength over deflectors. Such foams are suitable as lightweight alternatives to traditional energy absorbing applications.

20 Claims, No Drawings

ENERGY ABSORBING, WATER BLOWN, RIGID POLYURETHANE FOAM

FIELD OF THE INVENTION

The invention generally relates to energy absorbing rigid polyurethane foam compositions. More particularly, the present invention relates to low density, predominantly open celled water blown rigid polyurethane foams which are processable over a relatively broad range and can be used for both side impact and head impact energy management applications, among others.

BACKGROUND OF THE INVENTION

Energy absorbing rigid polyurethane foams, per se, have become increasingly important in various industries, particularly the automobile industry, in view of stringent regulations being enacted. Thus, there has been a relatively recent focus on energy absorbing polyurethane foam systems.

For example, U.S. Pat. No. 4,866,102 describes moldable energy absorbing rigid polyurethane foam compositions which are prepared by the reaction of a graft polymer dispersion in a polyoxyalkylene polyether polyol with an alkylene oxide adduct of toluenediamine or diaminodiphenylmethane with an organic polyisocyanate in the presence of a crosslinking agent and water with an additional blowing agent. Similarly, U.S. Pat. Nos. 4,116,893; 4,190,712; 4,212,954; and 4,282,330 also describe energy absorbing foams utilizing graft polymer dispersions. U.S. Pat. No. 4,722,946 describes the production of energy attenuating viscoelastic polyurethane elastomers and foams, comprising mixtures of linear and branched polyol intermediates, polyisocyanates, and optionally, extenders, blowing agents, and the like, in the presence of a catalyst whereby the isocyanate index is varied from about 65 to about 85.

U.S. Pat. No. 4,696,954 describes the preparation of molded polyurethane foams characterized by high impact strength and good thermal stability. U.S. Pat. No. 4,614,754 describes a high density rigid polyurethane foam which exhibits nearly constant strain with increasing stress in compression. U.S. Pat. No. 4,585,807 describes rigid polyurethane foams employing oxyalkylated ethylenediamine. SAE Article 910404, "Fundamental Studies of Polyurethane Foam for Energy Absorption in Automotive Interiors," discusses, in general, energy-absorbing polyurethane foams.

Under ever increasing governmental regulations addressing both personal safety and environmental concerns auto manufacturers have been put in a position where they must meet stringent impact requirements, maintain vehicle weight and reduce the use of materials having a detrimental effect on the environment. Energy absorbing rigid polyurethane foams have provided a partial solution in some impact performance requirement areas; e.g. energy absorbing fillers which can be used to stiffen door support frames, thus aiding in preserving the structural integrity of the passenger compartment of an automobile or as bolsters which can reduce effects of secondary collision (occupant-to-interior). However, foams exhibiting the desired impact characteristics generally utilize chlorinated fluorocarbons as the foaming or blowing agent. That fact alone reduces their desirability in light of mandates to reduce and eventually eliminate the use of CFCS. Further, attempts to substitute water into foam formulations particularly useful for energy absorption applications have been largely unsuccessful. Limited success has been had with certain narrowly defined formulations using water as a blowing agent, and containing a polymer polyol (graft polyol) as necessary elements of the invention. U.S. Pat. Nos. 4,190,712; 4,212,954; and 4,116,893 disclose formulations for flexible or viscoelastic foams.

Of the known foam formulations, few, if any, are processable over a relatively broad range wherein the resulting foams can be utilized for either recoverable or friable energy management applications.

While many energy absorbing polyurethane foam compositions are known in the art, there appears to be a need for foam compositions ranging in Index from between about 50 to about 150 which offer, among other improvements, an expanded processing range. By an expanded processing range it is meant that the foam compositions of the present invention allow for a broader range of demold times and broader mold temperature and pressure capabilities with minimal, if any, sacrifice in foam performance.

SUMMARY OF THE INVENTION

The present invention relates to energy absorbing rigid polyurethane foam compositions, the process for preparing said foams and, the resultant articles of manufacture, e.g. side impact and head impact components for automotive applications. The foams of the present invention are predominantly open celled energy absorbing, rigid polyurethane foams essentially free of chlorinated fluorocarbons and volatile organic carbon blowing agents.

While the foams of the present invention are essentially free of chlorinated fluorocarbons, the foams have characteristics, such as a relatively flat crush strength and minimal spring back, comparable to energy absorbing rigid polyurethane foams utilizing chlorinated fluorocarbons as blowing agents at an index above about 80.

Surprisingly, it has been found that water blown rigid polyurethane foams can be produced in association with an active hydrogen containing component having a relatively high propylene oxide content which exhibit energy absorbing characteristics comparable to the CFC blown rigid polyurethane foams. The foams of the present invention have molded densities ranging from 2.0 pcf to about 10.0 pcf, and a crush strength which remains relatively flat on an analysis curve from about 30% to about 70% in loading of up to about 150 psi.

More particularly, the polyurethane foam of the present invention comprises the reaction product of:

a) an organic isocyanate;
b) a compound containing isocyanate reactive hydroxyl groups, said compound including at least 50.0 wt. % propylene oxide;
c) a catalyst;
d) a blowing agent including water, wherein the water is present in amounts sufficient to cause formation of a predominately open-celled foam, without causing collapse; and
e) optionally, one or more additives selected from the group consisting essentially of surfactants, crosslinkers, chain extenders, pigments, stabilizers, fungistats, bacteriostats, fillers and flame retarding agents.

The compound containing isocyanate reactive hydroxyl groups preferably will include between about 50.0 wt. % and about 80.0 wt. % propylene oxide.

The water must be present in amounts sufficient to act as a blowing agent and a cell opening agent promoting a predominantly open cell structure, yet not be present in amounts great enough to cause the foam to collapse. The amount of water used is highly dependent upon the other formulation components but it has been found that generally from about 1.0 weight percent to about 10.0 weight percent is an effective range. A preferred range of water is from about 2.0 weight percent to about 6.5 weight percent.

As a result of the present invention, various advantages have been noted including significant reductions in processing costs due to weight savings. For example, the foams of the present invention offer roughly a 25.0% weight reduction over other known energy management foams having the same physical properties. Yet another advantage is a reduction in raw material inventories since one system can be used to process multiple foams. Still further, the foams of the present invention offer improved processing features such as a wider processing window and improved material flow which leads to a decreased scrap rate. The resin composition of the present invention has been found to be stable with little if any separation over time. Additionally, the resulting foams can be processed on different foam machines and/or with different mixer heads without affecting the broad processing window afforded by the foam formulations of the present invention. Further, as a result of the present invention, the system consistently yields both production and prototype molded parts with enhanced physical properties and which are aesthetically appealing. Still other objects and advantages of the present invention will be ascertained from a reading of the following detailed description.

DETAILED DESCRIPTION OF THE PREFERRED EMBODIMENT

The polyisocyanates which may be used in the present invention are modified and unmodified polyisocyanates which are well known to those skilled in the art. For the purposes of this invention the term polyisocyanate is used to describe compounds containing, at least two isocyanate groups. Preferred isocyanates include 4,4'-diphenylmethane diisocyanate (MDI), mixtures of 4,4'- and 2,4-diphenylmethane diisocyanate, and polymeric polyisocyanates such as polymethylene polyphenylenes polyisocyanates (polymeric MDI). Included within the preferred isocyanates are those modified MDI's containing carbodiimide, allophanate, urethane or isocyanurate structures. The more preferred isocyanates are polymeric MDI and mixtures of polymeric MDI and pure 2,4' and 4,4'MDI. These polyisocyanates are prepared by conventional methods known in the art, e.g. phosgenation of the corresponding organic amine.

For purposes of the present invention isocyanates other than the preferred isocyanates may be present in minor amounts. Useful unmodified polyisocyanates include aliphatic or cycloaliphatic and aromatic polyisocyanates. Examples include 2,4- and 2,6-methylcyclohexylenediisocyanate; tetramethylene diisocyanate, cyclohexane diisocyanate, 2,4-toluene diisocyanate, 2,6-toluene diisocyanate, mixtures of 2,4- and 2,6-toluene diisocyanate, naphthalene-1,5-diisocyanate, 1-methoxyphenyl1-2,4-diisocyanate.

In the preparation of the polyurethanes of the present invention, a B side resin composition including a compound containing isocyanate reactive hydroxyl groups which is reactive with the isocyanate. Certain of the active hydroxyl group containing compounds useful in the preparation of polyurethanes are described in the Polyurethane Handbook in chapter 3, §3.1 pages 42–61; and in Polyurethane: Chemistry and Technology in Chapter 11, §§III and IV, pages 32–47. For example, of the many hydroxyl-group containing compounds which may be used are simple dihydroxy aromatics, bisphenols, and hydroxyl-terminated polyethers, polyesters, and polyacetals, among others. Extensive lists of compounds containing isocyanate reactive hydroxyl groups may be found in the above references and in many patents, for example in columns 2 and 3 of U.S. Pat. No. 3,652,639; columns 2–6, of U.S. Pat. No. 4,421,872; and columns 4–6 of U.S. Pat. No. 4,310,632; these three patents being hereby incorporated by reference.

The compounds containing isocyanate reactive hydroxyl groups, otherwise referred to herein as the isocyanate reactive compounds, will preferably include at least about 50.0 wt. % propylene oxide, and more preferably between about 50.0 wt. % to about 80.0 wt. %. Further, the isocyanate reactive compound will have a system average functionality greater than about 2.0 and less than about 4.0, with an average of about 3.0 being preferred. Preferably, the isocyanate reactive hydrogen containing compounds will have a relatively low average viscosity, i.e. between about 1000 to about 5000 cps at 25° C., and most preferably between about 2500 to about 3500 cps at 25° C. Additionally, the average molecular weight for the isocyanate reactive component will be between about 100 to about 5000, more preferably between about 1000 to 3000 and still more preferably, about 1900.

Hydroxyl-terminated polyoxyalkylene polyols may also be employed provided the component including active hydroxyl groups includes at least 50.0 wt. % propylene oxide. Such polyols can be prepared by well known methods, for example by the base catalyzed addition of an alkylene oxide, preferably ethylene oxide (oxirane) or butylene oxide (ethyloxirane) to an initiator molecule containing on the average two or more active hydrogens can be used in accordance with the teachings of the present invention. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines and monoesters of glycerine; trihydric initiators such as glycerine, trimethylolpropane, trimethylolethane, N-alkyl-phenylenediamines, mono-, di, and trialkanolamines; tetrahydric initiators such as ethylene diamine, propylene diamine, 2,4'-, 2,2'-, and 4,4'-methylenedianiline, toluenidiamine, and pentaerythritol; pentahydric initiators such as diethylenetriamine; and hexahydric and octahydric initiators such as sorbital and sucrose.

Addition of alkylene oxide to the initiator molecules may take place simultaneously or sequentially when more than one alkylene oxide is used, resulting in block, heteric, and blockheteric polyoxyalkylene polyethers. The number of hydroxyl groups will generally equal the number of active hydrogens in the initiator molecule. Processes for preparing such polyethers are described both in the Polyurethane Handbook and Polyurethanes: Chemistry and Technology as well as in many patents, for example U.S. Pat. Nos. 1,922, 451; 2,674,619; 1,922,459; 3,190,927; and 3,346,557.

Polyester polyols may also be utilized in forming the active hydroxyl group containing component. Such polyesters are well known in the art and are prepared simply by polymerizing polycarboxylic acids or their derivatives for example their acid chlorides or anhydrides, with a polyol. Numerous polycarboxylic acids are suitable, for example, malonic acid, citric acid, succinic acid, glutaric acid, adipic acid, pimelic acid, azelaic acid, sebacic acid, maleic acid, fumaric acid, terephthalic acid, and phthalic acid.

Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylenepolyoxypropylene glycols. These lists of dicarboxylic acids and polyols are illustrative only, and not limiting. An excess of polyol should be used to ensure hydroxyl termination. Methods of preparation of such polyester polyols are given in the *Polyurethane Handbook* and in *Polyurethane.v Chemistry and Technology*.

In an especially preferred embodiment, it has also been found that acceptable foams are produced by adding only limited amounts of graft polymer dispersions, if any, to the resin component. For purposes of the present invention, the graft polymer dispersions are present in amounts of less than about 50.0 weight % based on the total amount of the B side resin.

To the limited extent that graft polymers, i.e. graft polyols, are included, the graft polymer dispersions are typically prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, and the like; substituted styrenes such as cyanostyrene, nitrostyrene, N,N-dimethethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methylacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, NN-dimethylacrylamide, N,N-didibenzylacrylamide, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropanol acetate, vinyl formate, vinyl acrylate, vinyl methacrylate, vinyl methoxycetate, vinyl benzoate, vinyltoluene, vinylnaphthalene, vinyl methyl ether, vinyl ethyl ether, vinyl propyl ethers, vinyl butyl ethers, vinyl 2-ethylhezyl ether, vinyl phenyl ether, vinyl 2-methoxyethyl ether, methoxybutadiene, vinyl 2-butoxyethyl ether, 3,4.dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole and the like; dimethyl fumarate, dimethyl maleate, maleic add, crotanic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and compounds listed above are only illustrative of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 60 percent, preferably from 30 percent to 45 percent, based on the total weight of the prcduct. The polymerization occurs at a temperature between about 25° C. and 180° C., preferably from 80° C. to 135° C.

The unsaturated polyols or macromers which may be employed in preparing the graft polymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methylacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. Again, it should be stressed that very limited amounts of graft polymers should be employed, if any.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetal peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide. isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohyexyl hydroperoxide, trans-decalin hydroperoxide, α-methylbenzyl hydroperoxide, α-methyl-α-ethyl benzyl hydroperoxide, diphenylmethyl hydroperoxide, α,α'-azobis-(2-methyl hetonitrile), 1-t-butylazo-1-cyanocylclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azo-bis-2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isobutyronitrile, to butylperoxyisopropyl carbonate and the like, a mixture of initiators may also be used. The preferred initiators are 2,2'-azobis(2methylbutyronitrile), 2,2'-azobis (isobutyronitrile), 2,2-azobis(2,4-dijmethylvaleronitrile), 2-t-butylazo-2cyano-4-methoxyl-4-methyl pentane, 2-t-butylazo-2-cyano-4-methylpentane, 2-t-butylazo-2-cyanobutane and lauroyl peroxide. Generally, from about 0.1 percent to about 10 percent, preferably from about 1 percent to about 4 percent, by weight of initiator based on the weight of the monomer will be employed in the process of the invention.

Any suitable catalyst or mixture of catalysts may be used including tertiary amines such as, for example, triethylenediamine, N-methylmorpholine, N-ethylmorpholine, diethyletholamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin-di-2-ethyl hexonate, potassium hexanoate, stannous oxide, as well as other organometallic compounds such as are disclosed in U.S. Pat. No. 2,846,408.

In some instances, a surface-active agent is necessary for production of polyurethane foam. Numerous surface-active agents have been found satisfactory. Of these, the nonionic surface-active agents such as the well-known silicones have been found particularly desirable when use of a surfactant is necessary. Other surface-active agents which are operative, although not preferred, include polyethylene glycol ethers of long chain alcohols, tertiary amine or alkinol amine salts of long chain alkyl acid sulfate esters, alkyl sulfonic esters, and alkyl arylsulfonic acids. Use of a surfactant in the present invention is optional.

A chain extender and/or crosslinker may also be employed in accordance with the teachings of the present invention. These include those compounds having at least two functional groups bearing active hydrogen atoms such as, hydrazine, primary and secondary diamines, amino alcohols, amine acids, hydroxy acids, glycols or mixtures thereof.

Other optional additives which fall within the spirit of the present invention include known pigments such as carbon black, dyes, stabilizers against aging and weathering, fungistats, bacteriostats, fillers, or flame retarding agents.

If desired, flame retardants may be incorporated in the foams. Among the flame retardants which may be employed are: pentabromodiphenyl oxide, dibromopropinol, tris($\beta$-chloropropyl)phosphate, 2,2-bis(-bromoethyl) 1,3-propanediol, tetrakis(2-chloroethyl)ethylene diphosphate, tris(2,3-di-bromopropyl)phosphate, tris($\beta$-chloroethyl) phosphate, tris(1,2-dichloropropyl)phosphate, bis-(2-cholorethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane.

The following illustrates the nature of the invention and are not to be construed as limitations on the scope of the invention. All amounts are in parts by weight unless otherwise indicated.

Polyol A is a propylene oxide adduct of ethylenediamine having a hydroxyl number of 480, theoretical functionality of 4.0, and 87 wt. % propylene oxide.

Polyol B is a propylene oxide adduct of ethylenediamine having a hydroxyl number of 767, a theoretical functionality of 4.0, and 79 wt. % propylene oxide.

Polyol C is an all ethylene oxide adduct of an aliphatic triol with a hydroxyl number of 920, a theoretical functionality of 3.0 and 0% propylene oxide.

Polyol D is 40% solids content dispersion of acrylonitrile/styrene copolymer in a propylene oxide/ethylene oxide adduct of an aliphatic triol having an overall hydroxyl number of 30, a theoretical functionality of 3.0 and 88 wt. % propylene oxide.

Polyol E is 30% solids content dispersion of acrylonitrile/styrene copolymer in a propylene oxide/ethylene oxide adduct of an aliphatic triol having an overall hydroxyl number of 25, a theoretical functionality of 3.0, and 84 wt. % propylene oxide.

Polyol F is an aliphatic diol/tetrol co-initiated propylene oxide adduct, having a hydroxyl number of 555, a theoretical functionality of 3.5 and 40 wt. % propylene oxide.

Polyol G is an aliphatic diol/tetrol co-initiated propylene oxide adduct having a hydroxyl number of 450, a theoretical functionality of 3.5 and 51 wt. % propylene oxide.

L-550 is a silicone surfactant commercially available from Union Carbide.

BL-11 is an amine catalyst sold by Air Products.

BL-17 is a delayed action amine catalyst sold by Air Products.

BL-19 is an amine catalyst sold by Air Products.

UAX-6191 is a silicone surfactant.

UAX-6193 is a silicone surfactant.

PC-46 is a catalyst sold by Air Products.

PC-38 is a catalyst sold by Air Products.

DC-193 is a silicone surfactant sold by Dow Corning.

DEOA is 99% diethanolamine having a theoretical hydroxyl number of 1603.

DPG is dipropylene glycol having a theoretical hydroxyl number of 836.

ISO A is a polymethylene polyphenyl polyisocyanate having an average nominal functionality of about 2.7 and an isocyanate content of about 32.0% by weight.

ISO B is a polymethylene polyphenyl polyisocyanate having an average nominal functionality of 3.0, a viscosity of about 700 cps at 25° C. and an isocyanate content of about 31.0% by weight.

| Component | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Polyol A | | | 27.54 | 27.54 | 27.54 | | | | | 9.0 | | | | | 15.0 |
| Polyol B | | 27.54 | | | | | | | | | | | | | |
| Polyol C | | | | | | | | | | | | | | | 20.0 |
| Polyol D | 30.5 | 26.15 | 26.15 | 26.15 | 26.15 | 30.4 | 30.4 | 30.4 | 27.4 | 27.4 | 27.4 | 27.4 | 27.4 | 27.4 | |
| Polyol E | | 26.15 | 26.15 | 26.15 | 26.15 | | | | | | | | | | 41.0 |
| Polyol F | | 15.6 | 15.6 | 15.6 | 15.6 | | | | | | | | | | |
| Polyol G | 63.0 | | | | | 62.0 | 62.0 | 51.25 | 55.8 | 55.8 | 56.1 | 55.8 | 55.8 | 55.8 | 20.0 |

-continued

| Component | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| L-550 | | 0.53 | 0.53 | 0.53 | | | | | | | | | | | |
| BL-11 | | | | | | | | | | | 0.53 | 0.53 | 0.53 | 0.5 | |
| BL-17 | | 0.53 | 0.53 | 0.53 | 0.53 | 0.6 | 0.6 | 0.6 | 0.53 | 0.53 | | | | | |
| BL-19 | 0.6 | | | | | | | | | | | | | | 0.5 |
| UAX-6191 | | | | | | | | | | | | | 0.9 | | |
| UAX-6193 | 0.9 | | | | | 1.0 | 1.0 | 1.0 | 0.9 | 0.9 | 0.90 | 0.90 | | 0.5 | |
| PC-46 | | | | | | 0.75 | 0.75 | 0.75 | 0.67 | 0.67 | 0.67 | 0.67 | 0.67 | 0.67 | |
| DC-193 | | | | | | | | | | | | | | | 1.0 |
| P-355 | | | | | | | | 10.0 | | | | | | | |
| DEOA | 2.0 | | | | | 3.0 | 3.0 | 3.0 | 3.2 | 3.2 | 3.2 | 3.2 | 3.2 | 2.72 | |
| DPG | | | | | | | 10.0 | | 9.0 | | 9.0 | 9.0 | 9.0 | 9.0 | |
| Water | 2.5 | 3.5 | 3.0 | 2.0 | 2.5 | 3.0 | 3.0 | 3.0 | 2.5 | 2.5 | 2.0 | 2.5 | 1.5 | 2.3 | 3.0 |
| TOTAL | 99.5 | 100.0 | 99.5 | 98.5 | 98.47 | 100.75 | 110.75 | 100.0 | 100.0 | 100.0 | 99.8 | 100.0 | 99.0 | 98.89 | 100.5 |

EXAMPLES 1–15

Amount of Isocyanate per 100 grams of Resin

| System No. | 90 Index | 100 Index | 120 Index | 130 Index | 140 Index | Isocyanate |
|---|---|---|---|---|---|---|
| 1 | — | — | 137 | 148.4 | 160 | ISO A |
| 2 | — | 126.4 | 151.7 | 164.3 | 177 | ISO A |
| 3 | — | 100.4 | 120.5 | 130.6 | 140.6 | ISO A |
| 4 | — | 66.4 | 150.7 | 112.3 | 120.9 | ISO A |
| 5 | — | 94 | 112.7 | 122.1 | 131.5 | ISO A |
| 6 | — | 120.5 | 155.6 | 163.2 | 175.7 | ISO A |
| 7 | 122.5 | 136.1 | 163.3 | 176.9 | 190.5 | ISO A |
| 8 | — | 126.2 | 151.4 | 164 | 176.7 | ISO A |
| 9 | 122.5 | 136.1 | 163.3 | 176.9 | 190.5 | ISO B |
| 10 | 126.9 | 141 | 169 | — | 197.4 | ISO B |
| 11 | — | — | 147.8 | — | — | ISO B |
| 12 | — | 134.8 | 161.8 | — | — | ISO A |
| 13 | — | 122.2 | 146.6 | 158.8 | 171 | ISO A |
| 14 | — | 125.5 | 150.6 | — | — | ISO A |
| 15 | — | 128.4 | 154.1 | — | — | ISO A |

| Sample No. | |
|---|---|
| 1 | Thin parts processed well, but thicker parts split apart. |
| 2 | Smaller parts processed well, but more complicated parts did not fill well due to poor flow characteristics. |
| 3 | Thin/small parts processed well, but thicker parts split apart. |
| 4 | Did not process well. Very poor surface quality. |
| 5 | Did not process well. Cure time was too long for most parts. |
| 6 | System processed well on smaller parts. Large parts split apart. |
| 7 | System processed well under controlled conditions (i.e. component temps below 100° F.) |
| 8 | System processed well under controlled conditions and on smaller parts. |
| 9 | Poor physical properties. |
| 10 | Did not process well . . . all of the blocks split apart. |
| 11 | Did not process well . . . blocks intermittently split. |
| 12 | Did not process well . . . blocks split apart. |
| 13 | Acceptable products but very small processing window. |
| 14 | Acceptable products but very small processing window. |
| 15 | Wide processing window and processes well. |

As indicated above, the composition of Sample Nos. 13–15 led to foams which exhibited both excellent physical characteristics with Sample No. 15 further exhibiting the broadest processing range. In this regard it was observed that demold times ranged from 3–5 minutes depending on part geometry and density. Additionally, the mold temperatures ranged from 100–170° F. and the composition temperatures ranged from about 80–120° F., without significant changes in foam performances.

The resin Samples 13–15 did not appear to separate out over time, had a low viscosity and tended to fill complicated mold geometries without shear lines, skimming or voids. Surprisingly, it was discovered that the resulting foams can be tailored to meet different compressive strength requirements merely by altering the water content of the resin.

While it will be apparent that the preferred embodiments of the invention disclosed are well calculated to fulfill the objects stated, it will be appreciated that the invention is susceptible to modification, variation and change without departing from the spirit thereof.

We claim:

1. A resin composition for use in preparing rigid, energy absorbing polyurethane foams comprising:
   a) an isocyanate-reactive component comprising:
      1) a compound containing isocyanate reactive hydroxyl groups, said compound including at least 50.0 wt. % propylene oxide;
      2) a graft polymer dispersion, wherein the graft polymer dispersion is present in amounts of less than about 50.0 weight %, based on the total weight of resin components; and
      3) an all ethylene oxide adduct of an aliphatic triol;
   b) a blowing agent consisting essentially of water, wherein the water is present in amounts sufficient to cause formation of a predominately open-celled foam, without causing collapse;
   c) a catalyst;
   d) a surfactant; and optionally,
   e) chain extenders, crosslinkers, flame retardants, fillers, fungistats and bacteriostats.

2. The resin composition of claim 1, wherein component a1) includes between about 50.0 wt. % to about 80.0 wt. % propylene oxide.

3. The resin composition of claim 1, wherein water is present in amounts of from about 1.0 to about 10.0 weight percent.

4. The resin composition of claim 1, wherein water is present in amounts of from about 2.0 to about 6.5 weight percent.

5. The resin composition of claim 1, wherein component a) has an average functionality of greater than about 2.0 and less than about 4.0.

6. The resin composition of claim 1, wherein component a) has an average viscosity of between about 2500 to about 3500 cps at 25° C.

7. The resin composition of claim 1, wherein component a) has an average molecular weight of between about 1000 to about 3000.

8. The resin composition of claim 1, wherein component a1) comprises a propylene oxide adduct of ethylenediamine.

9. The resin composition of claim 1, wherein component a2) comprises a dispersion of acrylonitrile/styrene copolymer in a propylene oxide/ethylene oxide adduct of an aliphatic triol.

10. A resin composition for use in preparing rigid, energy absorbing polyurethane foams comprising:
   a) an isocyanate-reactive component comprising:
      1) a compound containing isocyanate reactive hydroxyl groups, said compound including at least 50.0 wt. % propylene oxide;
      2) a graft polymer dispersion, wherein the graft polymer dispersion is present in amounts of less than about 50.0 weight %, based on the total weight of resin components; and
      3) an all ethylene oxide adduct of an aliphatic triol;
   b) a blowing agent comprising water;
   c) a catalyst;
   d) a surfactant; and optionally,
   e) chain extenders, crosslinkers, flame retardants, fillers, fungistats and bacteriostats,
wherein said resin composition is essentially free of chlorinated fluorocarbons and volatile organic carbon blowing agents, and the blowing agent is present in an amount sufficient to cause formation of a predominately open-celled foam, without causing collapse.

11. The resin composition of claim 10, wherein component a1) includes between about 50.0 wt. % to about 80.0 wt. % propylene oxide.

12. The resin composition of claim 10, wherein water is present in amounts of from about 1.0 to about 10.0 weight percent.

13. The resin composition of claim 10, wherein water is present in amounts of from about 2.0 to about 6.5 weight percent.

14. The resin composition of claim 10, wherein component a) has an average functionality of greater than about 2.0 and less than about 4.0.

15. The resin composition of claim 10, wherein component a) has an average viscosity of between about 2500 to about 3500 cps at 250° C.

16. The resin composition of claim 10, wherein component a) has an average molecular weight of between about 1000 to about 3000.

17. The resin composition of claim 10, wherein component a1) comprises a propylene oxide adduct of ethylenediamine.

18. The resin composition of claim 10, wherein component a2) comprises a dispersion of acrylonitrile/styrene copolymer in a propylene oxide/ethylene oxide adduct of an aliphatic triol.

19. A resin composition for use in preparing rigid, energy absorbing polyurethane foams comprising:
   a) an isocyanate-reactive component comprising:
      1) a polyoxyalkylene adduct of ethylenediamine containing at least 50.0 wt. % propylene oxide;
      2) less than about 50.0 weight %, based on the total weight of resin components, of a graft polymer dispersion, wherein the graft polymer dispersion comprises a dispersion of acrylonitrile/styrene copolymer in a propylene oxide/ethylene oxide adduct of an aliphatic triol; and
      3) an all ethylene oxide adduct of an aliphatic triol;
   b) a blowing agent consisting essentially of water, wherein the water is present in amounts sufficient to cause formation of a predominately open-celled foam, without causing collapse;
   c) an amine catalyst;
   d) a silicone surfactant; and optionally,
   e) chain extenders, crosslinkers, flame retardants, fillers, fungistats and bacteriostats.

20. The resin composition of claim 19, wherein water is present in amounts of from about 2.0 to about 6.5 weight percent.

* * * * *